July 11, 1972 R. W. KIESS 3,676,007
DIRECT READING FILTER PHOTOMETER
Filed Feb. 9, 1971 3 Sheets-Sheet 1
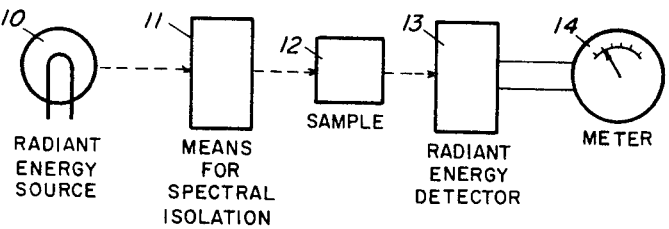
FIG.1
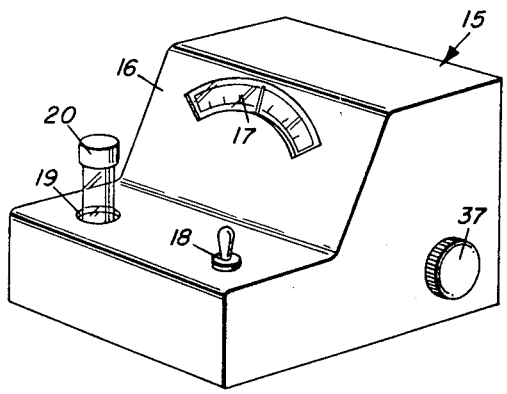
FIG.2
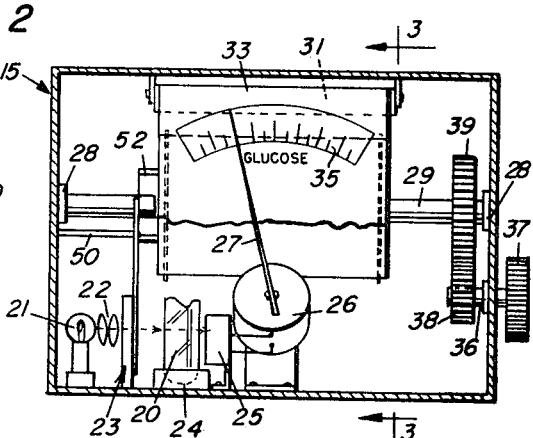
FIG.3   FIG.4
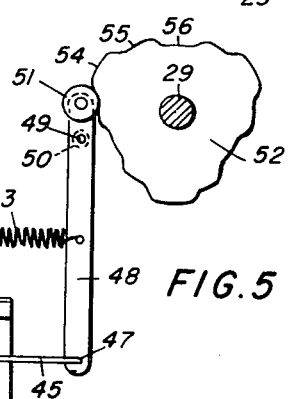
FIG.5
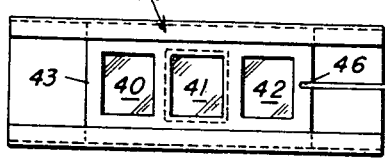

July 11, 1972  R. W. KIESS  3,676,007
DIRECT READING FILTER PHOTOMETER
Filed Feb. 9, 1971  3 Sheets-Sheet 2

INVENTOR
Raymond W. Kiess

July 11, 1972  R. W. KIESS  3,676,007
DIRECT READING FILTER PHOTOMETER
Filed Feb. 9, 1971  3 Sheets-Sheet 3
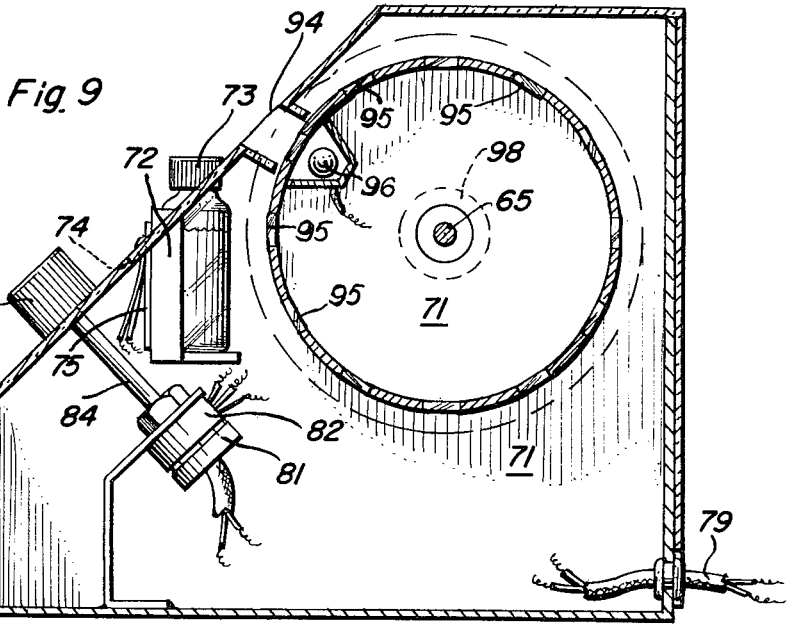
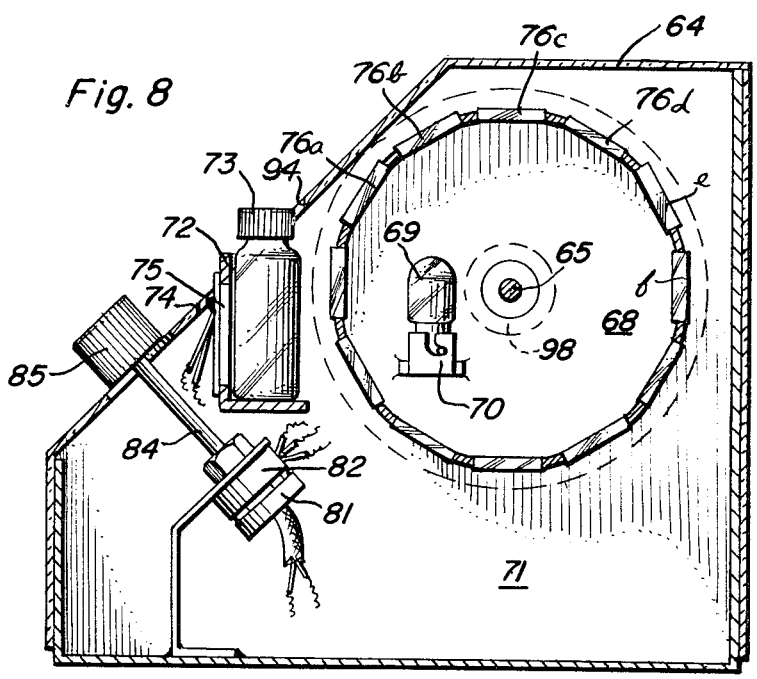
INVENTOR
Raymond W. Kiess

United States Patent Office 3,676,007
Patented July 11, 1972

3,676,007
DIRECT READING FILTER PHOTOMETER
Raymond W. Kiess, Miami, Fla., assignor to Kiess Instruments, Inc., Miami, Fla.
Continuation-in-part of application Ser. No. 692,525, Dec. 21, 1967. This application Feb. 9, 1971, Ser. No. 113,881
Int. Cl. G01j 1/42, 3/48
U.S. Cl. 356—184
13 Claims

ABSTRACT OF THE DISCLOSURE

A direct reading filter photometer for chemical analysis is provided with a plurality of meter scales and a plurality of color filters with interlocking means for automatically selecting the scale and filter appropriate to the specific analysis to be performed.

---

This application is a continuation-in-part of my co-pending application Ser. No. 692,525, now Pat. No. 3,561,878 filed Dec. 21, 1967.

This invention relates to the chemical quantitation or quantitative analysis of certain constituents present in blood, urine and other body fluids that are of significant interest to the medical and health professions, for the detection of pathological conditions of the human or animal bodies and also as a guide to dictate therapy as well as serving as a parameter to judge prognostically as to the state of health or morbidity of the organism.

Procedural simplification, from a viewpoint of chemical analysis, as well as instrumentation, has resulted as the development of the state of the art has progressed.

Simply stated, biochemical colorimetry is based upon the measurement of color developed by certain chemical reactions, the color developed usually being stoichimetrically related to the concentration of the constituent being analyzed.

In the early years of biological or clinical chemistry, the colors developed in a chemical reaction were compared visually with those of known concentrations. Thus, the unknown constituents could be approximated and the results could even be interpolated in certain instances.

The twin-cup type visual colorimeter followed and a split-field comparator was used to indicate an approximation of color equilibrium, the concentration being related to the relative depths of immersion of the optical probes.

Later, filter potometers evolved which used a filter to isolate the useable and desired portion of the spectrum, and later prisms, diffraction gratings and intereference filters were introduced, all of which greatly increased the sensitivity, specificity, reproducability, and accuracy of the procedure. It also removed the human element from matching colors visually.

Other instruments also evolved utilizing the ultraviolet and infra-red portions of the spectrum.

As the state of the art progressed, different chemical formulations of reagents which were more specific and possessed more desirable stability characteristics were developed. Until this stage was reached, different batches of reagents had to be tested and graps constructed to relate color development to terms of concentration.

The art has now evolved to the point that colorimeter or spectrophotometer scales can be directly calibrated to be read in terms of concentration, rather than to take a reading from the meter and refer to a calibration table, or graph, to relate this reading to meaningful terms of concentration. Methods have also been introduced whereby a sinle calibrated meter with a keying mechanism can be inserted in a colorimeter, thus making certain that the appropriate filter is properly positioned in the light beam or, several scales can be inscribed on the meter face with no provision made for the changing of filters.

It is quite apparent that the first of the two approaches mentioned in the previous paragraph has the limitation of cost because a separate meter movement must be used for each particular test, as well as being awkward and cumbersome and, that the latter approach is limited because of physical limitations as to the number of arcs capable of being inscribed thereon are limited to four or five, and the lack of any provision for selecting the proper filter.

The present invention relates to a direct reading filter photometer and describes apparatus that will allow the selection of a suitable scale in terms of the constituent to be quantitated, as well as the selection of an appropriate filter, in a simple and reliable manner so as to leave no opportunity for error.

Other objects and advantages will be apparent to those skilled in the art after reading the following specification in connection with the annexed drawings in which:

FIG. 1 is a diagrammatic representation of the basic components of a photometer spectrophotometer;

FIG. 2 is an isometric view of a preferred form of filter photometer constructed in accordance with the teachings of the present invention;

FIG. 3 is a cross-sectional elevation of the device of FIG. 2 taken on the line 3—3 of FIG. 4;

FIG. 4 is a cross-section taken on the line 4—4 of FIG. 3;

FIG. 5 is a fragmentary view of an enlarged scale of the camming mechanism used for shifting the filter means;

FIG. 8 is a vertical cross-section on the line 7—7 of FIG. 6;

FIG. 9 is a vertical cross-section on the line 8—8 of FIG. 6: and

Figure 6:
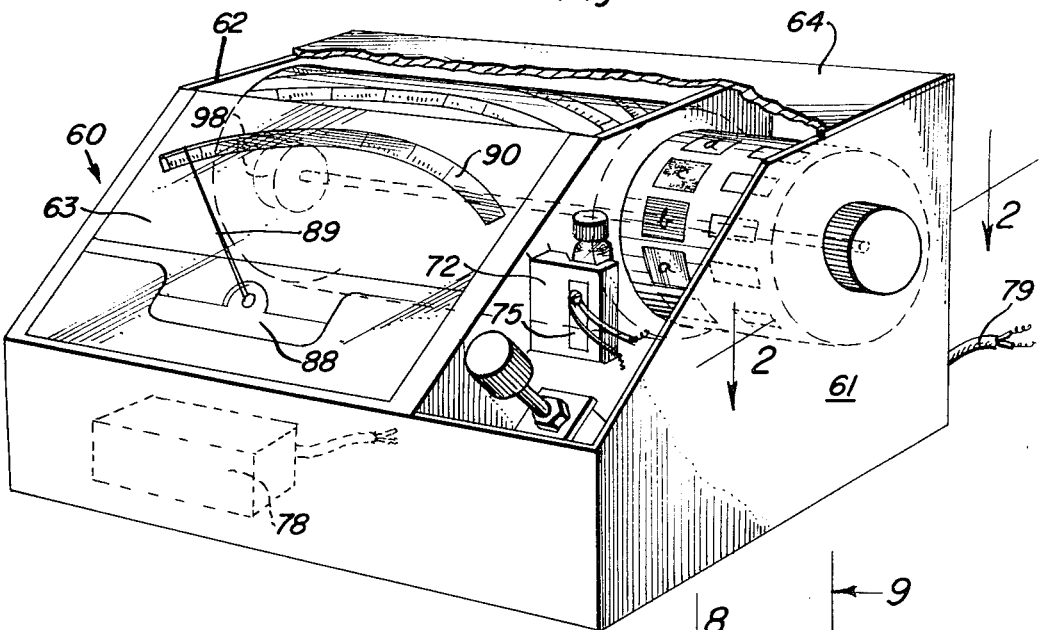
FIG. 6 is a perspective view of a modified form of filter photometer in accordance with the invention with a portion of the cover removed.
Figure 7:
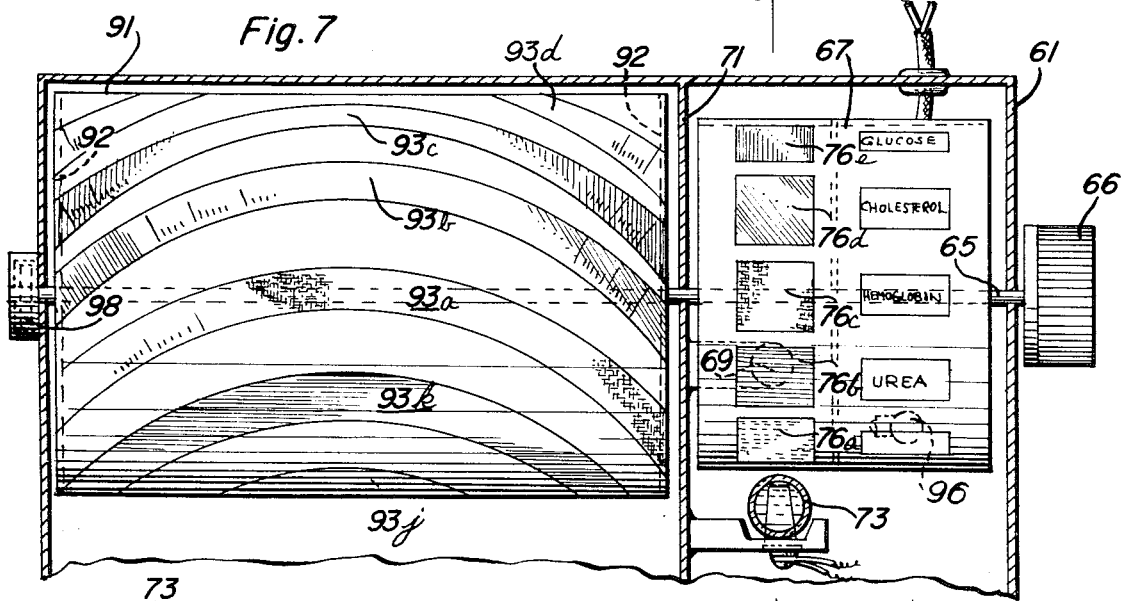
FIG. 7 is a plan view of the same.

FIG. 1 represents, in diagrammatic form, the usual arrangement of components which comprise a filter photometer for spectral analysis of a liquid sample, in which numeral 10 indicates generally a source of radiant energy such as an electric lightbulb, numeral 11 indicates a filter for isolating portions of the visible spectrum which is placed in the path of light from the source so as to pass through a sample of liquid to be analyzed, indicated by numeral 12, after which the light impinges upon a radiant energy detector, or transducer means, indicated generally by numeral 13, capable of transforming received light energy into a electrical energy in proportion to the intensity of radiant energy impinging upon the detector, this intensity being noted in terms of electrical energy by means such as the meter, indicated generally by numeral 14.

The following table gives an idea of the numerous tests which may be conducted upon liquid samples wherein it is preferable in each case to employ a radiant energy source having a specific optimum wave length for each test.

This table shows the numerous constituents that may be measured, the optimum wavelength of the filter to be used, and the procedural references. This list is shown for reference only and does not mean to infer that either the procedural reference and wavelength indicated, or test for constituents are a limiting factor, as other suitable test procedures and associated wavelengths could be interchanged or different constituents altogether could be quantitated without detracting in any manner from either the uniqueness or value of this invention.

| Constituent | Optimum wavelength for quantitation, mu. | Procedural reference |
| --- | --- | --- |
| Serum glutamic oxalacetic transaminase | 505 | Frankel et al. |
| Serum glutamic pyruvic transaminase | 505 | Do. |
| Hemoglobin | 540 | Drakbin. |
| Urea nitrogen | 540 | Berthelot. |
| Cholesterol | 640 | Liebermann-Burchartd. |
| Glucose | 540 | Washko, Rice. |
| Bilirubin | 540 | Malloy, Evelyn. |
| Alkaline phosphatase | 660 | Bodansky. |
| Acid phosphatase | 660 | Do. |
| Icterus index | 420 | Meulengracht. |
| Thymol turbidity | 640 | Kunkel, Hoagland. |
| Calcium | 550 | Connerty, Riggs. |
| Inorganic phosphorus | 660 | Fiske, SubbaRow. |
| Protein | 540 | Biuret. |
| Albumin | 615 | Rodkey. |
| Zinc sulfate turbidity | 650 | Kunkel. |
| Uric acid | 660 | Henry, Caraway. |
| Lipids | 640 | Kunkel, Ehrens, Eisenmenger. |

Moreover, while the foregoing table indicates that there are optimum values for the light waves used in each of the tests to be conducted, the usual filter photometer is provided with only a single filter designed to pass light rays having a broad spectrum of frequency and thus it will be realized that, even if a number of interpolation tables are provided (based on the known frequency of the single filter) a sacrifice of accuracy will result. On the other hand, even if the filter photometer is provided with several interchangeable filters, a separate interpolation table is required for each test.

Thus it is one purpose of the present invention to provide, not only a means for supplying a plurality of calibrated scales for a meter to enable the percentage of constituent substances to be read directly from the deflection of the meter pointer, but also to provide a plurality of filter means to enable tests for each constituent material to be conducted with a light source having the optimum wave length for that material in accordance with the procedure appropriate for each analysis.

Therefore, a preferred embodiment of the invention comprises a housing, indicated generally by numeral 15 in FIG. 2, having a front panel 16 provided with a transparent window 17, a switch 18 for controlling the supply of electricity to the device and a suitable opening 19 to permit the insertion therein of a cuvette 20 and containing a sample (not shown) of a liquid to be analyzed. Within the housing there is provided a suitable source of radiant energy, such as a small lightbulb 21, provided with the usual condensing lens system 22 which directs the light from the lightbulb through a filter means, identified generally by numeral 23 and shown in an enlarged scale in FIG. 5. A support 24 for the cuvette enables the cuvette to be placed in the path of light rays from the filter means 23 so that they will impinge on the radiant energy detector 25, which may be of any standard type such as a photocell, or other similar device which transforms radiant energy into electrical energy and is connected in a circuit with the meter 26 having a movable pointer, or other indicating device 27.

Mounted upon a suitable support 28 within the housing is a horizontally positioned shaft 29 which carries a pair of axially spaced sprocket wheels 30. Also mounted within the housing are a pair of horizontally mounted elongated rollers 31 and 32 positioned in such a manner as to display an endless strip of flexible sheet material 33, the margins of which are perforated so as to engage with the teeth 34 of the sprockets 30. This sheet, as will be seen in FIG. 4, has upon its surface a plurality of indicia, such as the individually calibrated scales for the different analytical tests. For example, in FIG. 4, there is shown the appropriate scale 35 for testing glucose. Other scales for the test, as exemplified in the table above, are imprinted on other portions of the sheet (not shown) and these scales may be brought into position to be viewed through the window 17 in conjunction with the pointer 27 by rotation of the sprockets 30. Means is provided for changing the position of this sheet manually by the provision of a stub shaft 36 extending through one side of the housing and having an externally mounted actuating knob 37 attached thereto. The stub shaft also carries a pinion 38 in engagement with a gear 39 on the shaft 29.

The filter means 23, as viewed in FIG. 3, is shown in enlarged detail in FIG. 5 and in a preferred form comprises a series of filters 40, 41 and 42, each having a particular wave length isolating characteristics, mounted in side by side relationship in a supporting strip of material 43, which is mounted for horizontal sliding movement in a slideway 44 in such a manner that the respective filters may be selectively positioned in the path of light from the source 21 which passes through the cuvette 20 to the radiation detector 25.

The position of the filters may be controlled by means of linkage means including an arm 45 having a pivotal connection 46 at one end joining it to the support for the filters and pivotally connected at 47 to one end of another arm 48, this arm being mounted on a medial pivot 48 carried by a supporting bracket 50 attached to the interior of the housing. The other end of arm 48 is provided with a roller 51 which acts as a cam follower in operative engagement with the peripheral surface of a rotatable cam 52 fixed to the shaft 29. A coil spring 53 connected between the arm and the housing urges the roller into an engagement with the cam.

It will be noted that the cam is provided with a series of dwells 54, 55 and 56, for example, each of these dwells comprises surfaces which are concentric with the axis of rotation of the cam spaced from the axis at differing radial distances and, as a result, rotation of the cam will position different ones of the filters 40, 41 and 42 in the light path depending upon which of the dwells on the cam is in engagement with the cam follower 51. Furthermore, it will also be apparent that rotation of the shaft 29 and the sprocket wheels 30 will move the sheet 33 for the purposes of positioning the appropriate scale 35 adjacent the pointer 27. Thus, when it is desired to conduct a specific filter photometer analysis of a liquid the positioning of the desired scale in the window 17 of the housing will at the same time bring into position in the light path the appropriate filter for carrying out the test in question.

In the form of the invention shown in FIGS. 6–10, the component parts are contained within a cabinet, indicated generally by numeral 60, having a pair of end walls 61 and 62, a sloping front panel 63 and a flat top 64. The end walls support a horizontal shaft 65 for rotational movement under control of a manually operable knob 66 projecting exteriorly of one side of the cabinet. This shaft supports an assembly of scales, filters and indicating means, one portion of which is represented by a drum shaped element 67 which may be concentrically supported on the right hand end of shaft 65 by means of a centrally disposed radial web 68 (see FIG. 9). Within the drum on the left side, as seen in FIG. 8, there is a radiant energy source, such as an incondescent electric lamp 69, removably mounted in a socket 70 attached to an inner transverse wall 71. This wall also supports a holder 72 to removably support a cuvette 73 containing a specimen of liquid to be analyzed in an upright position and which can be inserted or removed through an opening 74 in the front panel. The holder 72 also supports a photocell 75 positioned on the side of the cuvette away from the lamp 69 so that the cuvette will be positioned in the path of light from the lamp. In addition, this portion of the drum 67 is also provided with a series of circumferentially arranged openings each of which contains a light filter, identified by numerals 76a, 76b, 76c, 76e, etc. Each of these filters is desired to isolate a portion of the radiant energy spectrum which is received from source 69 and to permit that portion of the spectrum to pass on through the cuvette and its contents and to the photocell 75 which is appropriate to the test being conducted.

Figure 10:
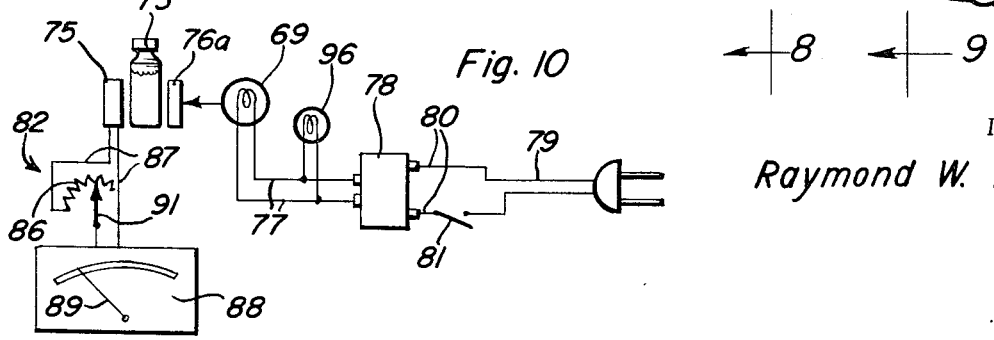
FIG. 10 is a schematic wiring diagram of the apparatus shown in FIGS. 6–8.

As shown schematically in the wiring diagram of FIG. 10, the lamp 69 may be energized by means of wires 77 connected between the socket 70 and a step-down transformer 78 contained within the cabinet the primary of this transformer being connected with a line cord 79 by means of wires 80, one of which may be controlled by a switch 81 which is combined in accordance with conventional practice with a potentiometer 81 mounted on bracket 83 attached to the bottom of cabinet 60 and controlled by shaft 94 which projects through an opening in the panel 63 and terminates in a knob 85. Obviously, this is a matter of convenience and the switch could be separately controlled.

The potentiometer includes a resistance 86 which is connected by wires 87 with the photocell 75, one of these wires being also connected to one side of a meter 88 provided with a movable indicating device such as the pointer 89. The meter is secured to the underside of panel 63 at the left side of the cabinet so that the indicating end of the pointer may be visible through a transparent semicircular window 90 in the panel 63 and the other side of the meter is connected by a wire 91 of the movable contact (not shown) of potentiometer 82.

Below the window 90 there is a circular drum 91 supported on shaft 65 by means of transverse end webs 92 and appearing on the surface of the drum are a plurality of scales 93a, 93b, 93c, 93j and 93k. The number of scales corresponds to the number of filters on drum 67 but the corresponding scale will be angularly offset for reasons which will be self-evident when it is realized that each scale is calibrated to indicate either a percentage, or finite amount, of a material present in a specimen being examined by light passing through a particular filter. Since the light path from source 69 lies in a horizontal plane, while the corresponding scale is being viewed through the window 90 from an angularly upwardly directed position normal to panel 63, the scales are angularly displaced by the amount of tilt of the panel.

The front panel is also provided with another rectangular transparent window 94 at the right hand side through which the right hand side of drum 67 may be viewed, this portion of the drum being provided with a series of indicia 95a, 95b, 95c, 95d, 95e, etc. bearing the names of the individual tests capable of being conducted by corresponding combinations of scales 95 and filters 76. Since these indicia are also viewed from an upwardly angularly directed position through window 94 the indicia for any given test will be generally positioned circumferentially on drum 67 in alignment with the corresponding scale on drum 91 but angularly offset with respect to the corresponding filter on drum 67. In addition, while it is not an essential feature, it is considered desirable that the drum be provided with a series of circumferentially arranged openings and that the indicia be translucent and arranged in these openings for illumination by a lamp 96 mounted in socket 97 mounted on end wall 61 within the interior of drum 67. The lamp can also be supplied from the secondary of transformer 78 under control of switch 81, as shown in FIG. 10. A still further refinement of the arrangement consists in color coding the scales and indicators so that the indicia will appear against a background of similar colors in each of the windows 90 and 94 and also to provide an additional visual indication of the test being performed.

In operation, the knob 85 will be turned to close the switch 81 to energize both lamps 69 and 96. By observing the indicators through window 94 the knob 66 is rotated until the indicator for the desired test is brought into view, which action simultaneously and automatically brings the correct scale into view in window 90 and places the correct filter into the path of radiant energy emitted by lamp 69. In order to ensure that the assembly will remain in position until changed a detent mechanism 98, of conventional construction, can be connected with the shaft 65 to frictionally hold it in any of the selected positions. When the appropriate test has been selected, the potentiometer can be adjusted by turning knob 85 to obtain a zero reading of the pointer 91 on the appropriate scale and when the cuvette 73 is inserted into the holder the change in the light transmission through the specimen contained therein will be recorded by the position of the pointer on the scale which is calibrated either in terms of a percentage, or in absolute units of the material being investigated.

While two forms of the invention have been described in the foregoing specification, it will be obvious that various modifications and improvements may be made which would come within the scope of the amended claims.

The claims are:

1. In direct reading filter photometers for use in performing a plurality of chemical analyses of liquid samples, wherein the concentration of a specific constituent of a sample for each particular analysis is proportional to the intensity of radiant energy of a particular frequency range transmitted through a sample, the combination including a source of radiant energy, transducer means positioned to be responsive to radiant energy from said source, receptacle means for supporting a cuvette containing sample liquid to be analyzed in said path of radiant energy, said transducer means including pointer means responsive to radiant energy received from said source through a filter means and sample liquid and displaceable in proportion to the intensity of said received radiant energy, a unitary assembly comprising a plurality of individual scale means and a plurality of individual filter means, each said filter means isolating a particular frequency range of radiant energy emitted from said source, each of said scale means being provided with indicia calibrated to indicate the concentration of a specific constituent related to a particular analysis as a function of the displacement of said pointer means in response to the intensity of radiant energy received from said source through a particular one of said filter means, means to selectively position each of said scale means for use with said pointer means, and selector means including a common drive means connected with said unitary assembly to position a particular one of said filter means in said path of radiant energy and a particular one of said scale means with said pointer means for performing selectively each of said particular analyses, whereby the corresponding particular filter means will be positioned in said path of radiant energy by said common drive means when the latter is actuated to position a particular scale means for a particular analysis.

2. The invention as defined in claim 1, wherein said unitary assembly of individual scale means and filter means comprises means to mount said scale means for movement in a linear path toward and away from a fixed position for display with said pointer means and means to mount said filter means for movement in a linear path into and out of said path of radiant energy.

3. The invention as defined in claim 2, wherein said means to mount the scale means and filter means comprises a drum shaped structure concentrically mounted on a rotatable shaft means.

4. The invention as defined in claim 3, wherein said drum means also includes a plurality of indicia means circumferentially positioned thereon to be individually displayed to identify the test to be conducted with each combination of scale means and filter means.

5. The invention as defined in claim 4, wherein said scale means and indicia means are individually color-coded.

6. The invention as defined in claim 3, wherein said photometer includes a cabinet to enclose said unitary assembly, said cabinet including a front panel provided with a window for selectively viewing only a single one of said scale means.

7. The invention as defined in claim 6, wherein said shaft means includes detent means for positioning said scale means for said selective viewing.

8. The invention as defined in claim 1 wherein said unitary assembly includes means to mount said individual filter means for movement in an orbital path into and out of said path of radiant energy.

9. The invention as defined in claim 8, wherein said orbital path of movement of the filter means is generally circular and said unitary assembly also includes means to mount said scale means for movement in a generally circular orbital path.

10. The invention as defined in claim 9, wherein the orbital paths of the filter means and scale means are generally concentric.

11. The invention as defined in claim 10, wherein said photometer includes a cabinet to enclose said unitary assembly, and said unitary assembly includes common rotatable shaft means supported in the cabinet to support the means to mount the scale means and filter means, said cabinet having a front panel provided with a window for selectively viewing one of said scale means.

12. The invention as defined in claim 11, wherein said cabinet also includes means to visually identify the particular scale means being viewed.

13. The invention as defined in claim 12, wherein said means to identify the particular scale means includes a series of indicia movable with said scale means and means to selectively illuminate the indicia corresponding to the scale means being viewed.

References Cited
UNITED STATES PATENTS 3,561,878   2/1971   Kiess _____ 356—184

WILLIAM L. SIKES, Examiner

R. T. WEBSTER, Assistant Examiner

U.S. Cl. X.R.

356—188, 189, 227, 228; 250—218